United States Patent [19]

Granger

[11] Patent Number: 4,834,321

[45] Date of Patent: May 30, 1989

[54] ARTICULATED HELIPORT PAD

[76] Inventor: Denis Granger, 119 Kramer Dr., New Iberia, La. 70560

[21] Appl. No.: 23,630

[22] Filed: Mar. 9, 1987

[51] Int. Cl.⁴ ................................................ B64F 1/16
[52] U.S. Cl. ............................... 244/110 E; 244/115; 410/12; 410/77
[58] Field of Search .................. 244/1 R, 63, 17.17, 244/114 R, 115, 116; 410/77, 80, 107, 111, 117, 157, 12, 100; 340/949

[56] References Cited

U.S. PATENT DOCUMENTS

| | | | |
|---|---|---|---|
| 1,470,266 | 10/1923 | Kirchner | 410/77 |
| 1,681,637 | 8/1928 | Hall | 244/116 |
| 1,848,472 | 3/1932 | Glessner | 244/116 |
| 1,918,523 | 7/1933 | Pyer et al. | 244/116 |
| 2,052,333 | 8/1936 | Williams | 340/949 |
| 2,944,492 | 7/1960 | Clejan | 410/77 |
| 3,075,731 | 1/1963 | Bennett et al. | 244/63 |
| 3,151,826 | 10/1964 | Michel | 244/17.17 |
| 3,210,029 | 10/1965 | Brusch et al. | 244/114 R |
| 3,785,316 | 1/1974 | Leming et al. | 244/116 |
| 4,171,114 | 10/1979 | Marden | 244/17.17 |

FOREIGN PATENT DOCUMENTS 299698  4/1929  United Kingdom ............ 244/114 R

Primary Examiner—Galen Barefoot
Attorney, Agent, or Firm—Rogers & Killeen

[57] ABSTRACT

An articulated heliport pad in which the pilot controls the rotation of a central disk for last minute changes in wind direction as well as the operation of a unique hold-down device.

18 Claims, 2 Drawing Sheets

ARTICULATED HELIPORT PAD

BACKGROUND OF THE INVENTION

The present invention relates to a heliport pad and more particularly to an articulated heliport pad with enhanced safety features.

Helicopters have found wide use in the transportation of personnel and material and are particularly advantageous environments where space is at a premium, e.g., the tops of tall buildings, hospitals, airports, ships at sea, structures in off-shore oil fields, etc. The landing and take off by helicopters from many of these structures is particularly difficult because of the effects which the structure itself has on the wind. A vertical movement of several feet at the ends of the helicopter rotors is not unusual in response to wind gusts, and the loading and unloading of helicopters with the engines running and the rotors engaged is particularly hazardous, especially when operating on unstable platforms such as ships and on off-shore platforms where the winds may be high, variable and obstructed only by the structure of the platform itself. In the operation of a helicopter, it is desirable to take off and land into the wind and it is also desirable to provide some means of immediately securing the helicopter to the platform upon landing and of permitting testing of the helicopter prior to take off without fear of unexpected lift off. The present invention provides a solution to these long known problems.

It has long been known that, the orientation of an aircraft with respect to the ground may be changed by a horizontal structure rotatable about a vertical axis as disclosed in the Anderson U.S. Pat. No. 2,395,528 dated Feb. 26, 1946. Moreover, it is known to rotate a platform for the purpose of making a limited adjustment to facilitate the orientation of a helicopter relative to the direction of the wind, as shown in the Lemming, et al. U.S. Pat. No. 3,785,316 dated Jan. 15, 1974 in a ship board environment.

Tie-downs for securing a helicopter to a pad are also well known and include simple cable devices as shown in the aforementioned Lemming et al. patent as well as haul-down cables such as disclosed in the Shawn U.S. Pat. No. 4,258,888 dated Mar. 31, 1981 and the Baekken U.S. Pat. No. 3,559,927 dated Feb. 2, 1971. Still other helicopters have been provided with an anchoring probe or harpoon whereupon the helicopter may be landed in particular spot where the probe attached to the helicopter may be grasped. Examples of such probes are disclosed in the Middleton U.S. Pat. No. 4,420,131 dated Dec. 13, 1983 and the Bennett, et al., U.S. Pat. No. 3,075,731 dated Jan. 29, 1963. In still other hold-down devices such as that disclosed in the Sardanowski, U.S. Pat. No. 4,174,081, hold-down is achieved by means of a vacuum cavity over which the helicopter lands. In some of these known devices, the pilot may have control of the release of the hold-down device.

While such known systems are advantageous, no known system has provided a fully integrated system whereupon the pilot, from the aircraft, may control the orientation of his helicopter relative to the wind during take-off and landing as well as the operation of a device achieving hold-down of the helicopter to the landing pad.

It is accordingly an object of the present invention to provide a novel heliport pad controllable by the pilot from the helicopter in its orientation.

It is another object of the present invention to provide a novel heliport pad controllable by the pilot from the helicopter as to the operation of a hold-down device.

Yet another object of the present invention is to provide a novel method of landing a helicopter whereby significant enhancement in safety for embarking and disembarking personnel is achieved.

Yet a further object of the present invention is to provide a novel method of enhancing the safety of the helicopter when taking off and landing.

These and many other objects and advantages of the present invention will be obvious to one skilled in the art from the claims and from the following detailed description when read in conjunction with the appended drawings.

THE DRAWINGS

THE DETAILED DESCRIPTION

Figure 1:
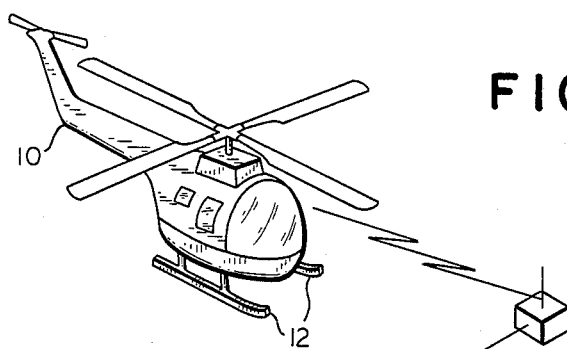
FIG. 1 is a pictorial view of a helicopter approaching a heliport of the present invention.

With reference to FIG. 1, a helicopter 10 having a pair of landing skids 12 is shown in flight approaching a heliport construed in accordance with the present invention.

As shown in FIG. 1, the heliport comprises a generally rectangular surface or pad 14 surrounded by a suitable conventional safety shelf 16 in which a number of lights 18 may have been installed. The lights 18 may be in a suitable conventional configuration and color, e.g., half red and half green, to show the location of the landing pad and/or the direction of the prevailing wind. Mounted centrally within the landing area 14 is a disk 20 which may also carry a plurality of lights 22 to show the orientation of the disk relative to the landing pad. Appropriate visual markings may also be provided on both the disk and the pad.

As shown in FIG. 1, the disk 20 is provided with two parallel elongated slots 24 disposed normal to the visual orientation of the disk 20 for reasons which will become apparant in the following discussion of the hold-down device.

Figure 2:
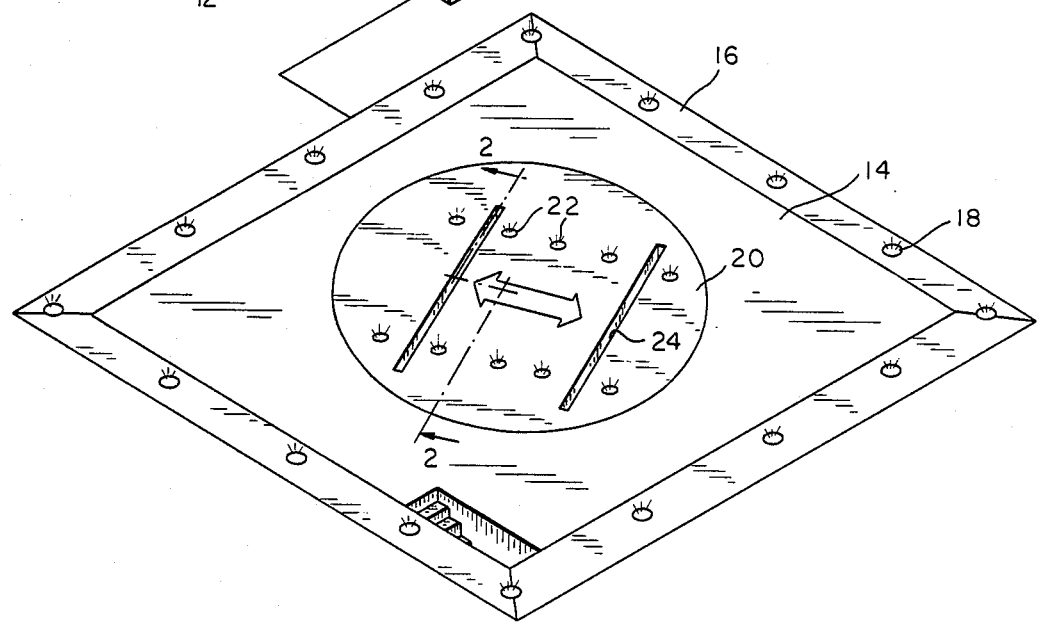
FIG. 2 is an elevation in partial section of the heliport pad of FIG. 1 along lines 2—2 showing a helicopter in place thereon.
Figure 2:
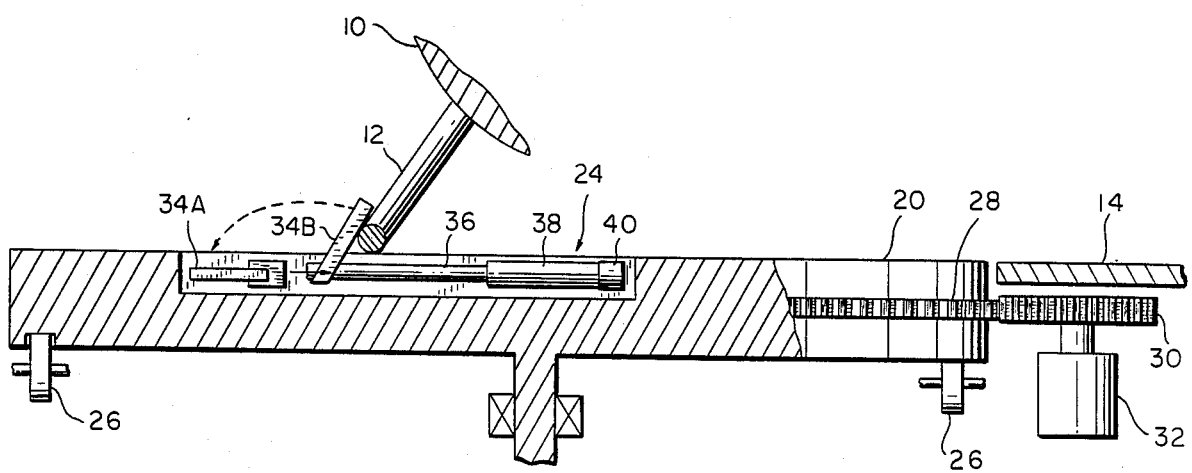

As shown in FIG. 2, the disk 20 may be of any suitable construction but is desirably supported at spaced points around its periphery by a pulling of roller supports 26 and is journaled for rotation about a central vertical axis. As illustrated in FIG. 2, the disk 20 may be provided with a gear teeth 28 around its periphery adapted to mate in a conventional manner with the teeth of a gear 30 driven by a suitable conventional means such as the illustrated electric motor 32. Alternatively, the driving of the disk 20 relative to the platform 14 may be accomplished by a chain drive, by worm gear or by any other suitable conventional means.

With continued reference to FIG. 2, the slits 24 of FIG. 1 may be provided with a latching mechanism 34, the position and displacement of which may be controlled in a suitable conventional manner by means such as the hydraulic piston 36 and cylinder 38 shown in FIG. 2. Control of the operation of the piston 36 may be accomplished by a radio responsive control device 40 so as to position the latching means from (a) a first position below the elevation of the surface of the disk 20 in the slot 24 to (b) a second position at an elevation above the level of the disk 20 and displaced sufficiently along the slot 24 to engage the horizontal bars of the landing skid 12 of a helicopter 10 as shown in FIG. 1.

Figure 3:
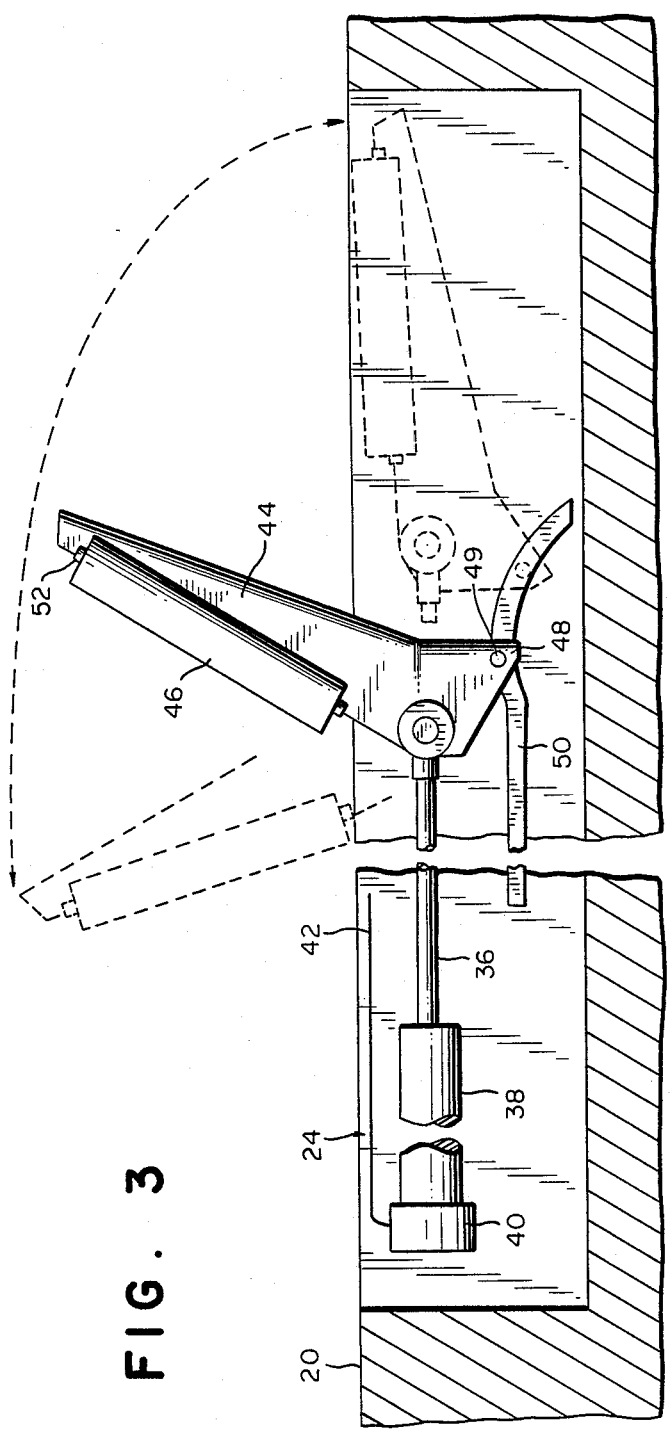
FIG. 3 is an elevation illustrating one embodiment of the hold-down of FIG. 2.

One embodiment of the latch is illustrated in FIG. 3 where the control device 40 is provided with a radio antenna 42 to effect the extension and retraction of the piston 36 from hydraulic cylinder 38 by the pilot from the helicopter. As may be seen in FIG. 3, an arm 44 may be pivotably connected to the end of the piston 36. The arm 94 may be provided with extension 48, in turn provided with a pin 49 to ride in a groove or other suitable camming surface 50 to control the attitude of the arm 44. By the proper positioning of the groove 50, relative to the path of the piston 36, the arm 44 with its roller 46 may be moved from a first position within the slot and below the elevation of the disk 20 (shown in dashed lines) through a second position illustrated in FIG. 3 to a third position in FIG. 3 (shown in dashed lines) which corresponds generally to the position of the latch 34 in FIG. 2.

The roller 46 may be journaled for rotation along its longitudinal axis by means of a pressure sensitive device 52 connected by electrical conductors (not shown in the interest of clarity) to the control device 40. In a preferred embodiment the pressure threshold of the device 52 is remotely controlled by the pilot.

Figure 4:
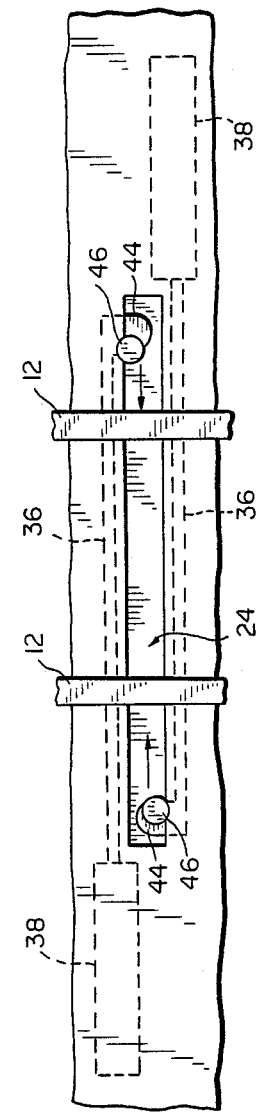
FIG. 4 is a fragmentary plan view of the disk of FIG. 1 illustrating the sharing of slots by opposing hold-down devices.

As shown in FIG. 4, opposing clamps or latches may share the same slot 24 to apply pressure to opposite sides of the landing skids 12 of the helicopter and thereby achieve a positive hold-down at plural points along the skids. The configuration of the clamps is, of course, a function of the type of landing gear, e.g., wheels, floats, skids, etc.

With continued reference to the figures, a preferred method of landing the helicopter may be understood. While in flight as shown in FIG. 1, a helicopter pilot may, by a predetermined frequency and/or other coded signal, orient the disk 20 relative to the wind so that the helicopter 10 may make a direct approach along the direction of the visual indicators to land the helicopter into the wind in the center of the disk with the skids 12 disposed normal to the slots 24.

Once the helicopter has touched down, the pilot may remotely activate the hold-down mechanism by a signal from the helicopter radio to the antenna 42 of the control device 40 shown in FIG. 3. Once activated, the hold-down mechanism will raise the clamp upwardly out of the slot 24 and cause the displacement thereof along the slot 24 into contact with the skid 12 as illustrated in FIG. 2. Each of the clamps may be independently operable and are desirably configured to be overridden upon the achievement of a predetermined pressure as sensed by the device 52.

The pilot, assured of a positive hold-down, may then disengage the rotor blades and kill the helicopter engine, permitting the passengers to disembark in total safety.

Upon the desire to take-off, the pilot may have the passengers embark in absolute safety and may then start the helicopter engine. Once the engine is started, the pilot may rotate the disk 20 to achieve the desired orientation of the helicopter into the wind and may then test the helicopter by engaging the rotors without releasing the hold-down. Once the test has been completed, the pilot may remotely release the hold-down and take-off, with the clamps automatically returning to their fully retracted position in the slots.

While a preferred embodiment of the present invention has been described, other variations and modifications will naturally occur to those skilled in the art from a perusal hereof. It is therefore to be understood that the embodiments herein are illustrative only, and that the scope of the invention is to be defined solely by the appended claims when accorded a full range of equivalents.

What is claimed is:

1. A helicopter landing pad comprising a substantially horizontal planar surface having a generally circular aperture;
   a disk substantially coplanar with said planar surface and substantially filling said aperture therein;
   selectively operable radio controlled means disposed beneath said planar surface for selectively rotating said disk within said aperture about a vertical axis; and
   selectively operable hold-down means carried by said disks for clamping the landing gear of a helicopter, said hold-down means including radio controlled clamping means selectively positionable from a first position at or below the elevation of said disk to a second position above the elevation of said disk clamping the landing gear of a helicopter.

2. The helicopter landing pad of claim 1 including first lighting means on said surface for indicating wind direction.

3. The helicopter landing pad of claim 2, wherein said first lightening means is radio controlled.

4. The helicopter landing pad of claim 3, including second lighting means carried by said disk to indicate the orientation thereof.

5. The helicopter landing pad of claim 1, including second lighting means carried by said disk to indicate the orientation thereof.

6. The helicopter landing pad of claim 5, wherein said second lighting means is radio controlled.

7. The helicopter landing pad of claim 1, wherein said disk rotating means includes a chain drive.

8. The helicopter landing pad of claim 1, wherein said disk includes a plurality of gear teeth around the periphery thereof,
   wherein said disk rotating means includes a motor driven gear in operable engagement with said gear teeth, and
   wherein said pad includes a plurality of rotatable supports each engaging said disk at one of a like plurality of spaced points adjacent the periphery thereof.

9. The helicopter landing pad of claim 1, wherein said disk includes a plurality of parallel slots;
   wherein each said slot in said disk includes a pair of clamps simultaneously displaceable toward each other to effect clamping of the helicopter; and
   wherein said clamping means are disposed within said slots below the upper surface of said disk in said first position.

10. The helicopter landing pad of claim 9 wherein the movement of said clamps is independently responsive to the pressure of engagement with the helicopter.

11. A helicopter landing pad comprising a substantially horizontal planar surface having a generally circular aperture;

a disk substantially coplanar with said planar surface and substantially filling said aperture therein;

means disposed beneath said planar surface for selectively rotating said disk within said aperture about a vertical axis; and selectively operable radio controlled hold-down means carried by said disk, for clamping the landing gear of a helicopter said hold-down means including clamping means selectively positionable from a first position at or below the elevation of said disk to a second position above the elevation of said disk clamping the landing gear of a helicopter, said hold-down means including pressure responsive means responsive to the pressure of engagement of said clamping means on the landing gear of a helicopter, and the locking of said hold-down means being responsive to said pressure means.

12. The helicopter landing pad of claim 11, wherein deactivation of said hold-down means is radio controlled, and including means for returning said hold-down means to said first position upon the deactivation thereof.

13. A method of landing a helicopter on a heliport having selectively rotatable landing disk with a selectively operable hold-down device comprising the steps of:
   (a) providing a selectively rotatable disk having a selectively operable hold-down carried by the disk;
   (b) selectively rotating the disk to a predetermined position relative to the wind;
   (c) landing the helicopter into the wind onto the disk;
   (d) activating the hold down responsively to the helicopter to secure the helicopter to the disk; and
   (e) thereafter shutting off the helicopter engine.

14. The method of claim 13 wherein the rotation of the disk is remotely controlled from the helicopter.

15. Means for selectively securing a helicopter to a generally horizontal heliport comprising:
   a surface;
   a plurality of elongated parallel slots in said surface;
   means associated with each of said slots adapted to clamp the landing gear of a helicopter;
   means associated with each of said slots for selectively positioning said clamps between a first position in one of said slots at an elevation below said surface and a second position above the elevation of said surface and displaced along the length of said slot sufficiently to contact with the landing gear of a helicopter, said means for displacing said clamps acting in opposite directions in different ones of said slots, each of said clamps including means for sensing the pressure of said clamp against the landing gear of the helicopter.

16. The helicopter securing means of claim 15 including two clamps and two selective positioning means associated with said slots;
   and wherein said two clamps for each of said slots are displaced in opposite directions.

17. The helicopter receiving means of claim 15 wherein each of said clamps includes an elongated roller for engaging the landing gear of the helicopter.

18. The helicopter receiving means of claim 15 wherein the displacement of the clamp in one of each of said slots is independent of the displacement of the clamp in each of the other of said slots.

* * * * *